C. A. DEAN & J. F. SHUFORD.
AUTOMOBILE CONSTRUCTION.
APPLICATION FILED DEC. 18, 1916.
1,290,522.
Patented Jan. 7, 1919.
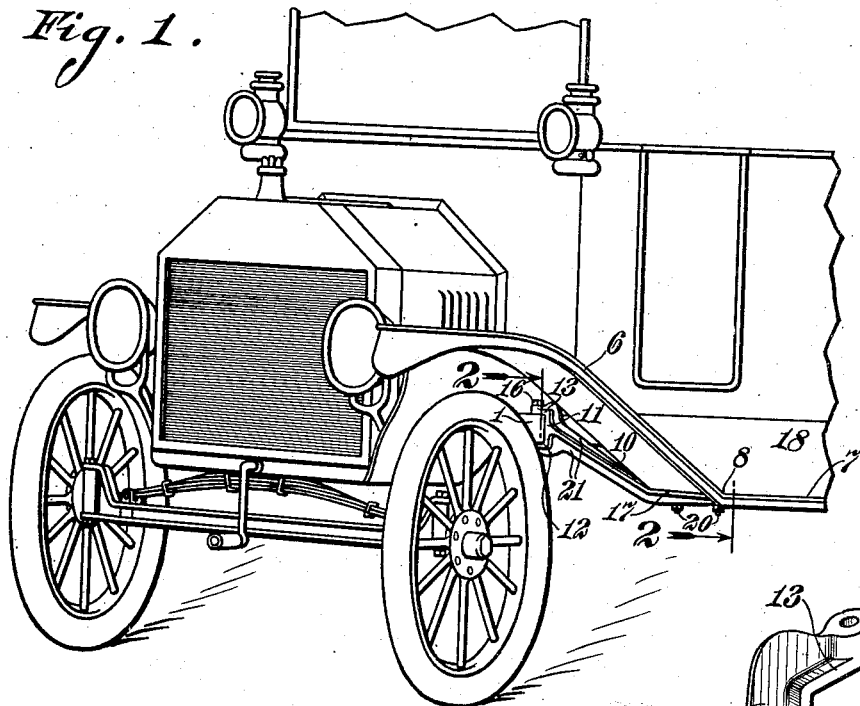
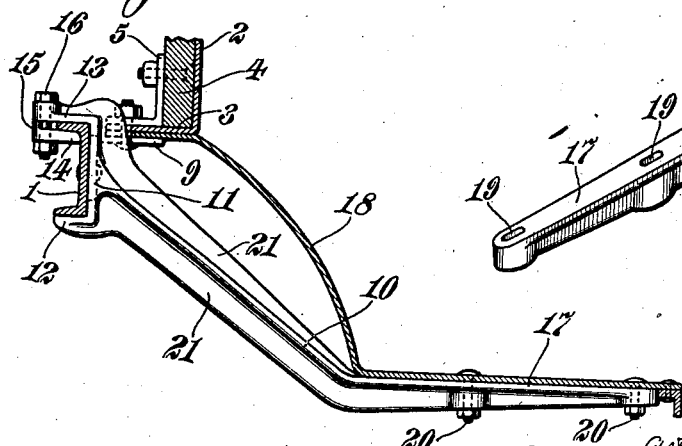
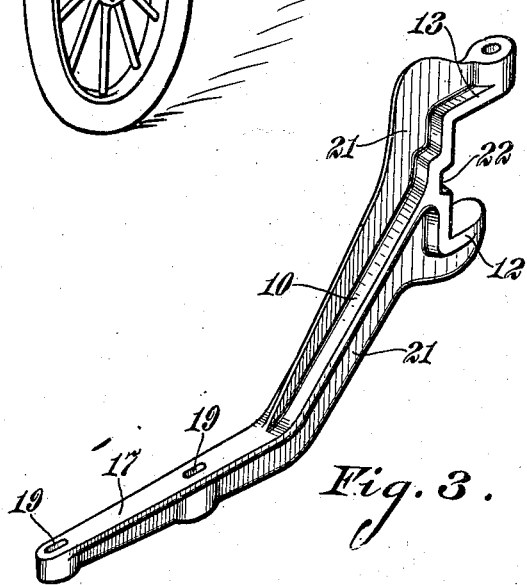
Inventors:
CLARK A. DEAN AND JOHN F. SHUFORD,
By John H. Bruninga.
Their Attorney.

UNITED STATES PATENT OFFICE.

CLARK A. DEAN AND JOHN F. SHUFORD, OF ST. LOUIS, MISSOURI, ASSIGNORS TO SHUR-NUFF MANUFACTURING COMPANY, OF ST. LOUIS, MISSOURI, A CORPORATION OF MISSOURI.

AUTOMOBILE CONSTRUCTION.

1,290,522.  Specification of Letters Patent.  Patented Jan. 7, 1919.

Application filed December 18, 1916. Serial No. 137,683.

*To all whom it may concern:*

Be it known that we, CLARK A. DEAN and JOHN F. SHUFORD, both citizens of the United States, and residing at St. Louis, in the State of Missouri, have invented the new and useful Improvement in Automobile Constructions of which the following is a specification.

This invention relates to automobiles, and more particularly, to the body and chassis construction thereof.

An automobile comprises a chassis upon which is mounted the body. The fenders and the running boards are usually attached to the body as supported on the chassis. Since the running board and fenders are often subjected to considerable strains, more especially at the forward ends and at the junction of the running boards and fenders, they often constitute a source of weakness.

Some of the objects of this invention, therefore, are to provide an automobile construction in which the running boards and fenders are firmly supported.

Another object is to provide a novel bracket adapted to support the fender and the running board at their junction, and adapted to be attached to the automobile, so as to be supported from the side frame of the chassis.

Further objects will appear from the detail description taken in connection with the accompanying drawing, in which:

Figure 1 is a perspective view of the front end of an automobile, and showing the supporting bracket embodying this invention;

Fig. 2 is a section on the line 2—2, Fig. 1; and,

Fig. 3 is a perspective view of the bracket.

Referring to the accompanying drawing, 1 designates one of the channel side frames of the chassis, 2 the outer metal sheathing of the body which is flanged, as shown at 3, 4 the wooden frame of the body, and 5 a bracket which is attached to the frame so as to support the body on brackets 9, attached to the chassis. One of the front fenders is shown at 6 and one of the running boards at 7, this fender and running board forming a junction at 8. The fender, running board and the guard 18 are supported from the body in the usual manner.

The bracket embodying this invention is shown at 10, and comprises a head 11 adapted to engage the outer face of the side frame 1, and provided with lower and upper inwardly facing, spaced lugs 12 and 13 adapted to take under and over the lower and upper flanges of the side frame, so that the head will embrace this side frame. The upper lug 13 extends transversely beyond the upper flange for some distance, and is perforated to receive a bolt, as hereinafter described. A block 14 is adapted to engage the lower face of the upper side frame flange, and is provided with a lug 15 to engage the lower face of the lug 13. This block is also perforated to receive the bolt 16 passing through the upper lug 13, so as to clamp the upper flange between the lug 13 and the block. The leg 17 of the bracket is adapted to support the running board and fender at their junction, and to secure the parts in position, this leg is provided with slots 19 adapted to receive bolts 20, which bolt the running board and fender at their junction to the bracket, the slots 19 being elongated so as to permit the bracket to be readily applied without accurate machine work. The bracket is strengthened by webs 21, so as to form a very rigid structure. The head 11 is recessed, as shown at 22, so as to take over any bolt or rivet head on the chassis side frame. The bracket thus suspended at its attached end from the upper flange of the side frame 1, while the lug 12 taking under the side frame acts as a fulcrum. Consequently, the strain thrown on the bolt 16 is a tensile strain, while the shearing strain is thrown on the bearing lug 12. Failure by shearing on account of the movement of the parts is, therefore, reduced to a minimum.

It will thus be seen that the bracket firmly supports the fender and the running board at their junction, and that the connection to the body and chassis side frame is made in such a manner as to form a braced and rigid attachment. The bracket can, of course, be readily applied to existing vehicles, and when in place will perform its useful function efficiently.

It is obvious that various changes may be made in the details of construction without departing from the spirit of this invention, and it is, therefore, to be understood that this invention is not to be limited to the specific construction shown and described.

Having thus described the invention, what is claimed is:

1. In an automobile having a chassis side frame and a fender and a running board, the employment of a fender and running board supporting bracket having a head adapted to engage the outer face of the side frame and provided with spaced upper and lower inwardly facing lugs adapted to embrace the side frame, and means for securing said upper lug to the side frame.

2. In an automobile having a chassis side frame of channel section and having a fender and a running board, the employment of a fender and running board supporting bracket having a head provided with a lug adapted to take over the upper flange of the side frame, and means for clamping said lug to the upper flange.

In testimony whereof we have hereunto affixed our signatures this 5th day of September, 1916.

CLARK A. DEAN.
JOHN F. SHUFORD.

Copies of this patent may be obtained for five cents each, by addressing the "Commissioner of Patents, Washington, D. C."